(12) United States Patent
Gvillo

(10) Patent No.: US 7,099,753 B2
(45) Date of Patent: Aug. 29, 2006

(54) AUTOMATIC GENERATION OF TELEMETRY FLIGHT SOFTWARE, ACCOMPANYING SPECIFICATIONS, AND DECODE FILES

(75) Inventor: Dennis W. Gvillo, Moro, IL (US)

(73) Assignee: The Boeing Company, Chicago, IL (US)

( * ) Notice: Subject to any disclaimer, the term of this patent is extended or adjusted under 35 U.S.C. 154(b) by 113 days.

(21) Appl. No.: 10/832,638

(22) Filed: Apr. 27, 2004

(65) Prior Publication Data
US 2005/0251298 A1 Nov. 10, 2005

(51) Int. Cl.
G06F 9/44 (2006.01)
G06F 7/00 (2006.01)

(52) U.S. Cl. .......................................... 701/3; 717/106
(58) Field of Classification Search ................. 717/106
See application file for complete search history.

(56) References Cited

U.S. PATENT DOCUMENTS

| | | | | |
|---|---|---|---|---|
| 5,212,634 | A * | 5/1993 | Washizaki et al. | 700/90 |
| 5,287,444 | A * | 2/1994 | Enescu et al. | 715/507 |
| 5,481,716 | A * | 1/1996 | Morshedi et al. | 717/106 |
| 6,048,366 | A * | 4/2000 | Ellis et al. | 703/8 |
| 6,631,519 | B1 * | 10/2003 | Nicholson et al. | 717/169 |
| 6,658,660 | B1 * | 12/2003 | Minyard | 717/171 |
| 2003/0046061 | A1 * | 3/2003 | Preston et al. | 704/9 |

FOREIGN PATENT DOCUMENTS

| | | | |
|---|---|---|---|
| JP | 2000-347840 | * | 12/2000 |
| JP | 2002-207611 | * | 7/2002 |

OTHER PUBLICATIONS

Vestal, Steve; Assuring the Correctness of Automatically Generated Software; IEEE, 1994; pp. 111-118.*
"What is MATRIXx?", http://www.ni.com/matrixx/what_is_matrixx.htm, © 2004 National Instruments Corporation, Austin, TX, USA.
Gvillo, Dennis W.; "EXHIBIT 1"; 2006; Boeing Aircraft Company, St. Louis, MO, USA.
Gvillo, Dennis W.; "EXHIBIT 2—Parameter_Definition.csv"; 2006; Boeing Aircraft Company, St. Louis, MO, USA.
Gvillo, Dennis W.; "EXHIBIT 3—Telemetry_Utilization.xls"; 2006; Boeing Aircraft Company, St. Louis, MO, USA.
Gvillo, Dennis W.; "EXHIBIT 4—tm_.ada"; 2006; Boeing Aircraft Company, St. Louis, MO, USA.

(Continued)

Primary Examiner—Michael J. Zanelli
(74) Attorney, Agent, or Firm—Shimokaji & Associates, P.C.

(57) ABSTRACT

A computer readable media, includes instructions capable of being interpreted for execution by a computer processor. The instructions provide information sufficient for: reading a master telemetry definition data file; producing a source code for implementing a data stream telemetry method, and generating documentation files for the source code. The source code includes a get component, a format component, and a blocks component. The get component includes source code for accessing flight software variable values according to the master telemetry definition data file. The format component includes source code for scaling the flight software variable values according to the master telemetry definition data file. The format component includes source code for formatting the values as telemetry stream parameters according to the master telemetry definition data file. The blocks component includes source code for placing telemetry parameters into a data stream according to the master telemetry definition data file.

29 Claims, 11 Drawing Sheets

OTHER PUBLICATIONS

Gvillo, Dennis W.; "EXHIBIT 5—tm_send_strapdown_nav_tm_data.ada"; 2006; Boeing Aircraft Company, St. Louis, MO, USA.

Gvillo, Dennis W.; "EXHIBIT 6—tm_tm_data_block.ada"; 2006; Boeing Aircraft Company, St. Louis, MO, USA.

Gvillo, Dennis W.; "EXHIBIT 7—tm_send_tas_tm_data.ada"; 2006; Boeing Aircraft Company, St. Louis, MO, USA.

Gvillo, Dennis W.; "EXHIBIT 8—tm_.ada"; 2006; Boeing Aircraft Company, St. Louis, MO, USA.

* cited by examiner

```
;;************************************************************************************
;;* GET: Name=AP  Hz=100   First_Frame=0   Make_Canned_Data=Yes   Function=AP.Get_TM_Data   Data_Type=AP.Telemetry_Message_Type
;;************************************************************************************
                                       n   f                     e
              r                        a   m   s   t         y   p
         d    d                        m   e   s   a   i   B T   *   M
         l    o                        e   s   i   l   #   R S 2 U   T
         i    c                        P   N   C   #   I   T L ( T
         F    R                        =   =   =   =   =   = = = = = =
                           202a──►    A001  U   8   I   E      0    AP.AP_Mode_Type─┐
         .Autopilot_Mode                                                             │
         .Autopilot_Time               A002  U  32   R   S           Secs            │
         .Fin1_cmd_deg                 A003  U  16   R   S      -14  Degrees         │
         .Fin2_cmd_deg                 A004  U  16   R   S       -8  Degrees         │
         .PID Test Number              A005  U   8   R   U       -8  Counts          │
         <NO ASSIGNMENT>               A006  U   8   I   C        0  Counts          │
         END GET:                                                                    │
;;************************************************************************************ 216
;;************************************************************************************   │
;; GET: Name=Fin  Hz=100   First_Frame=0   Make_Canned_Data=Yes   Function=Fin.Get_Fin_Subsystem_Data   Data_Type=Fin.Fin_Subsystem_Data_Type
;;************************************************************************************
                                       n   f                     e
              r                        a   m   s   t         y   p
         d    d                        m   e   s   a   i   B T   *   M
         l    o                        e   s   i   l   #   R S 2 U   T
         i    c                        P   N   C   #   I   T L ( T
         F    R                        =   =   =   =   =   = = = = = =
                           202b──►    C001  U  16   R   S       -8  Degrees
         .Fin_Reply_Message.Fin_1_Posn C002  U  16   R   S       -8  Degrees
         .Fin_Reply_Message.Fin_2_Posn
                                                                              218
                                                                               │
                                                              ┌────────────────┴──────┐
                                                              │ Autopilot Mode        │
                                                              │ Autopilot Time        │
                                                              │ No. 1 Fin Command     │
                                                              │ No. 2 Fin Command     │
                                                              │ PID Test Number       │
                                                              │ Autopilot Flags Byte  │
                                                              │                       │
                                                              │ D                     │
                                                              │ e   s                 │
                                                              │ s   c                 │
                                                              │ c   r                 │
                                                              │ r   i                 │
                                                              │ i   p                 │
                                                              │ No. 1 Fin Feedback    │
                                                              │ No. 2 Fin Feedback    │
                                                              └───────────────────────┘
```

Fig. 2A

```
.Fin_Reply_Message.Actuator_1_Current    C003    U  16  R  S  -7  Amps    ;  Fin Actuator 1 Current
.Fin_Reply_Message.Actuator_2_Current    C004    U  16  R  S  -7  Amps    ;  Fin Actuator 2 Current
<NO ASSIGNMENT>                          C005    U  24  I  C   0  Counts  ;  Fin BIT Failures
END GET:
;; *********************************************************
BLOCK: Name=100Hz_Info  Hz=100  First_Frame=0  First_Byte=1
    A001
    A002
    A003                                                                  } 234
    A004
    Spare_B03
    C001
    C002
END BLOCK:
;; *********************************************************
BLOCK: Name=20Hz_Info  Hz=20  First_Frame=1  Last_Byte=180
    A005
    Spare_B02                                                             } 236
    C003
    C004
END BLOCK:
;; *********************************************************
BLOCK: Name=1Hz_Fin_Info  Hz=1  First_Frame=3  Last_Byte=180
    C005                                                                  } 238
    A006
END BLOCK:
```

*Fig. 2B*

TM_Enums

| Enumeration Package.Name | Numeric Value | Enumerated Value | Description |
|---|---|---|---|
| Autopilot.AP_Mode_Type | 0 | Low_Gain | |
| | 1 | Mid_Gain | |
| | 2 | High_Gain | |

Fig. 6A

| Parameter | Description | Type | Scaling | Frame | Byte | msb | Bits | Rate | Units | Classification |
|---|---|---|---|---|---|---|---|---|---|---|
| A001 | Autopilot Mode | E | 0 | 0 | 0 | 0 | 8 | 100 | Autopilot.AP_Mode_Type | U |
| A002 | Autopilot Time | U | -14 | 0 | 1 | 0 | 32 | 100 | Secs | U |
| A003 | No. 1 Fin Command | S | -8 | 0 | 5 | 0 | 16 | 100 | Degrees | U |
| A004 | No. 2 Fin Command | S | -8 | 1 | 7 | 0 | 16 | 100 | Degrees | U |
| A005 | PID Test Number | U | 0 | 3 | 164 | 0 | 8 | 20 | Counts | U |
| A006 | Autopilot Flags Byte | C | 0 | 0 | 179 | 0 | 8 | 1 | Counts | U |
| C001 | No. 1 Fin Feedback | S | -8 | 0 | 12 | 0 | 16 | 100 | Degrees | U |
| C002 | No. 2 Fin Feedback | S | -8 | 1 | 14 | 0 | 16 | 100 | Degrees | U |
| C003 | Fin Actuator 1 Current | S | -7 | 1 | 167 | 0 | 16 | 20 | Amps | U |
| C004 | Fin Actuator 2 Current | S | -7 | 3 | 169 | 0 | 16 | 20 | Amps | U |
| C005 | Fin BIT Failures | C | 0 | 3 | 176 | 0 | 24 | 1 | Counts | U |

| Parameter | Field | TM RATE | Units | Most Neg Low_Gain | Most Pos High_Gain | Tiniest Mid Gain |
|---|---|---|---|---|---|---|
| A001 | .Autopilot_Mode | 100 | Autopilot.Ap_Mode_Type | | | |
| A002 | .Autopilot_Time | 100 | Secs | 0 | 262144 | 0.000061 |
| A003 | .Fin1_cmd_deg | 100 | Degrees | -128 | 127.9961 | 0.0039063 |
| A004 | .Fin2_cmd_deg | 100 | Degrees | -128 | 127.9961 | 0.0039063 |
| A005 | .PID_Test_Number | 20 | Counts | 0 | 255 | 1 |
| A006 | <NO_ASSIGNMENT> | 1 | | | | |
| C001 | .Fin_Reply_Message.Fin_1_Posn | 100 | Degrees | -128 | 127.9961 | 0.0039063 |
| C002 | .Fin_Reply_Message.Fin_2_Posn | 100 | Degrees | -128 | 127.9961 | 0.0039063 |
| C003 | .Fin_Reply_Message.Actuator_1_Current | 20 | Amps | -256 | 255.9922 | 0.0078125 |
| C004 | .Fin_Reply_Message.Actuator_2_Current | 20 | Amps | -256 | 255.9922 | 0.0078125 |
| C005 | <NO_ASSIGNMENT> | 1 | | | | |

Fig. 6D — 630

| Parameter | Canned Data | Sample Frame | Sample Rate | TM Rate | Set Most_Neg Low_Gain | Set Most_Pos High_Gain | Set Tiniest Mid Gain | Set Random_1 High_Gain | Set Random_2 High_Gain | Set Random_3 Low_Gain | Set Random_4 High_Gain |
|---|---|---|---|---|---|---|---|---|---|---|---|
| A001 | Yes | 0 | 100 | 100 | | | | | | | 108800 |
| A002 | Yes | 0 | 100 | 100 | 0 | 262143.9999 | 0.000061 | 136487.9999 | 60000 | 17744 | -121.671875 |
| A003 | Yes | 0 | 100 | 100 | -128 | 127.9960938 | 0.0039063 | -113.5078125 | 65.5898438 | -61.765625 | -70.625 |
| A004 | Yes | 0 | 100 | 100 | -128 | 127.9960938 | 0.0039063 | -83.6328125 | -105.8046875 | 44.2304688 | 226 |
| A005 | Yes | 0 | 20 | 20 | 0 | 255 | 1 | 70 | 154 | | 157 |
| A006 | No | | | | | | | | | | |
| C001 | Yes | 0 | 100 | 100 | -128 | 127.9960938 | 0.0039063 | -63.421875 | 38.6679688 | 26.9726563 | -9.859375 |
| C002 | Yes | 0 | 100 | 100 | -128 | 127.9960938 | 0.0039063 | 56.7929688 | 127.2617188 | 95.9257813 | -124.3671875 |
| C003 | Yes | 0 | 20 | 20 | -256 | 255.9921875 | 0.0078125 | -188.4375 | -199.234375 | 181.6484375 | -230.6875 |
| C004 | Yes | 0 | 20 | 20 | -256 | 255.9921875 | 0.0078125 | -111.890625 | -75.78125 | 101.1328125 | 214.3203125 |
| C005 | No | | | | | | | | | | |

```
RATE CODES: RATE:(Hz) CODE:
             100      :6
              50      :5  ⎫
              20      :4  ⎬ ─ 642
              10      :3  ⎪
               5      :2  ⎭
               1      :1
          644
BYTE\FRAME  \  0      1      2      3      4      5      6    · · ·   99
         0   A001:6 A001:6 A001:6 A001:6 A001:6 A001:6 A001:6        A001:6
         1   A002:6 A002:6 A002:6 A002:6 A002:6 A002:6 A002:6        A002:6
         2   A002:6 A002:6 A002:6 A002:6 A002:6 A002:6 A002:6        A002:6
         3   A002:6 A002:6 A002:6 A002:6 A002:6 A002:6 A002:6        A002:6
         4   A002:6 A002:6 A002:6 A002:6 A002:6 A002:6 A002:6        A002:6
         5   A003:6 A003:6 A003:6 A003:6 A003:6 A003:6 A003:6        A003:6
         6   A003:6 A003:6 A003:6 A003:6 A003:6 A003:6 A003:6        A003:6
         7   A004:6 A004:6 A004:6 A004:6 A004:6 A004:6 A004:6        A004:6
         8   A004:6 A004:6 A004:6 A004:6 A004:6 A004:6 A004:6        A004:6
         9     :6     :6     :6     :6     :6     :6     :6            :6
        10     :6     :6     :6     :6     :6     :6     :6            :6
        11     :6     :6     :6     :6     :6     :6     :6            :6
  646   12   C001:6 C001:6 C001:6 C001:6 C001:6 C001:6 C001:6        C001:6
        13   C001:6 C001:6 C001:6 C001:6 C001:6 C001:6 C001:6        C001:6
        14   C002:6 C002:6 C002:6 C002:6 C002:6 C002:6 C002:6        C002:6
        15   C002:6 C002:6 C002:6 C002:6 C002:6 C002:6 C002:6        C002:6
        16     :6     :6     :6     :6     :6     :6     :6   · · ·   :6
                   ─649   ─648
       164     :4   A005:4   :4     :4     :4     :4   A005:4 · · ·   :4
       165     :6     :6     :6     :6     :6     :6     :6            :6
       166     :6     :6     :6     :6     :6     :6     :6            :6
       167     :4   C003:4   :4     :4     :4     :4   C003:4          :4
       168     :4   C003:4   :4     :4     :4     :4   C003:4          :4
       169     :4   C004:4   :4     :4     :4     :4   C004:4          :4
       170     :4   C004:4   :4     :4     :4     :4   C004:4          :4
       171     :4     :6     :6     :6     :6     :6     :6            :6
       172     :4     :6     :6     :6     :6     :6     :6            :6
       173     :4     :6     :6     :6     :6     :6     :6            :6
       174     :4     :6     :6     :6     :6     :6     :6            :6
       175     :4     :6     :6     :6     :6     :6     :6            :6
       176     :4     :4     :4   C005:1   :4     :4     :4            :4
       177     :4     :4     :4   C005:1   :4     :4     :4            :4
       178     :4     :4     :4   C005:1   :4     :4     :4            :4
       179     :4     :4     :4   A006:1   :4     :4     :4   · · ·   :4
```

Fig. 6E

```
USED TM:
   13  100 Hz Used  Bytes =   1300  Bytes =  7%
    0   50 Hz Used  Bytes =      0  Bytes =  0%
   14   20 Hz Used  Bytes =    280  Bytes =  2%
    0   10 Hz Used  Bytes =      0  Bytes =  0%
    0    5 Hz Used  Bytes =      0  Bytes =  0%
    4    1 Hz Used  Bytes =      4  Bytes =  0%
Total Number Used   Bytes =   1584  Bytes =  9%

SPARE TM:
  153  100 Hz Spare Bytes =  15300  Bytes = 85%
       Frame #:  Start Byte:   End Byte:    # Bytes:
              0            9           11           3
              0           16          163         148
              0          165          166           2
    0   50 Hz Spare Bytes =      0  Bytes =  0%

52   20 Hz Spare Bytes =   1040  Bytes =  6%
       Frame #:  Start Byte:   End Byte:    # Bytes:
              0          164          164           1
              0          167          179          13
              2          164          164           1
              2          167          179          13
              3          164          164           1
              3          167          175           9
              4          164          164           1
              4          167          179          13

4   10 Hz Spare Bytes =     40  Bytes =  0%
       Frame #:  Start Byte:   End Byte:    # Bytes:
              8          176          179           4

4    5 Hz Spare Bytes =     20  Bytes =  0%
       Frame #:  Start Byte:   End Byte:    # Bytes:
             13          176          179           4

16    1 Hz Spare Bytes =     16  Bytes =  0%
       Frame #:  Start Byte:   End Byte:    # Bytes:
             23          176          179           4
             43          176          179           4
             63          176          179           4
             83          176          179           4

Total Number Spare Bytes = 16416  Bytes = 91%
```

AUTOMATIC GENERATION OF TELEMETRY FLIGHT SOFTWARE, ACCOMPANYING SPECIFICATIONS, AND DECODE FILES

STATEMENT REGARDING FEDERALLY SPONSORED RESEARCH OR DEVELOPMENT

This invention was made with Government support under contract number F33615-98-9-2880, awarded by the Defense Advanced Research Projects Agency (DARPA). The Government has certain rights in this invention.

BACKGROUND OF THE INVENTION

The present invention generally relates to automatic generation of software code and data files and, more particularly, to automated generation of telemetry software for use by flying vehicles, such as spacecraft, along with automated generation of a number of types of auxiliary data files for use with telemetry software.

Flying vehicles such as aircraft, spacecraft, and missiles often rely on embedded flight software for telemetry of flight information and control data to a ground control and monitoring center. An image familiar to most people is that of a NASA (National Aeronautics and Space Administration) or JPL (Jet Propulsion Laboratory) mission control room where perhaps dozens of engineers sit at computer consoles to monitor and control the flight of spacecraft. One of the tasks of such embedded flight software is to generate a telemetry stream of internal data from the vehicle. Such data may include, for example, position data (e.g., latitude, longitude, altitude), velocity, and orientation of the vehicle. When the vehicle is airborne, the flight software is required to generate this telemetry stream and radio it down to the ground where the data in it is unpacked and displayed in real-time.

The flight software and software required for unpacking and displaying telemetry data, i.e., decoding software, may vary from vehicle to vehicle and may even vary from mission to mission for the same vehicle and thus may need to be configured according to each project, i.e., vehicle and mission. The job of producing software for each project may be characterized by three major components: (1) defining the format of the telemetry stream in some readable format (e.g. an Excel file, or Word document); (2) writing the real-time embedded flight software that will gather up the necessary internal flight software variables and format them according to the defined format; and (3) writing the necessary decoding software that will reside in ground-based computers that will decode the telemetry stream according to the defined format.

Each of these three major job components is typically labor-intensive, error-prone, and time consuming. For example, there are usually hundreds of parameters to be telemetered, with each parameter having a number of attributes which must be captured (e.g., rate of telemetry, location in telemetry stream, number of bits occupied, how value is represented in the telemetry stream, any scaling of the parameter, description) yielding a large number of pieces of information that must be determined and entered appropriately. Processing the "information volume" alone can consume a large portion of project labor hours and schedule. In addition, both the flight software and the ground-based decoding software usually must be implemented, with the exact same values of these thousands of telemetry parameter attributes, by multiple engineers working in different groups. Some of the telemetry parameter attributes are forced to be entered into the flight software multiple times in slightly different representations—representations that may not be engineer-friendly, but are necessary to generate the flight software. The contingency that a particular piece of information may not be entered consistently in all places creates a possible source of error.

Thus, the telemetry flight software normally is, of necessity, voluminous and complex so that verification of its correctness, e.g., that the actual telemetry stream matches the definition of the format of the telemetry stream, can be difficult for telemetry flight software developers. The resulting flight software, in which the telemetry flight software may be embedded, is usually so large and complex that it may be difficult for fellow flight-software developers to adequately review the implementation of the telemetry flight software to help positively verify its correctness. For example, It is usually difficult to notice when one of the above described parameter attribute values is either determined or entered erroneously. Yet, it can be similarly time-consuming and error-prone to construct software tests to prove the correctness of the flight software. In the same vein, it is usually difficult to verify the correctness of the ground-based decoding software. Another difficulty that frequently arises is that all projects generally are forced to add to and change their telemetry streams multiple times as a project progresses, causing multiple iterations of many of the above challenges to be faced.

As can be seen, there is a need for providing telemetry flight software that is verifiable and providing such software along with reliable specifications for defining the format of the telemetry stream. There is also a need for providing decoding software and verification.

SUMMARY OF THE INVENTION

In one aspect of the present invention, a method includes the step of using a master telemetry definition data file to produce an operational flight program for telemetry.

In another aspect of the present invention, a method for producing telemetry flight software includes steps of: reading a master telemetry definition data file; and producing a source code for implementing a data stream telemetry method according to the master telemetry definition data file.

In still another aspect of the present invention, a method for producing telemetry flight software includes steps of: reading a master telemetry definition data file; and producing a source code for implementing a data stream telemetry method. The source code includes a get component and a blocks component. The get component includes source code generated according to the master telemetry definition data file for accessing flight software variables. The blocks component includes source code generated according to the master telemetry definition data file for placing telemetry parameters into a telemetry data stream.

In yet another aspect of the present invention, a method for producing telemetry flight software and documentation files includes steps of: reading a master telemetry definition data file; producing a source code for implementing a data stream telemetry method according to the master telemetry definition data file; and generating documentation files for the source code according to the master telemetry definition data file.

In a further aspect of the present invention, a computer readable media, includes instructions capable of being interpreted for execution by a computer processor. The instructions provide information sufficient for: reading a master telemetry definition data file; producing a source code for implementing a data stream telemetry method, and generating documentation files for the source code. The source code includes a get component, a format component, and a blocks component. The get component includes source code for accessing flight software variable values according to the master telemetry definition data file. The format component includes source code for scaling the flight software variable values according to the master telemetry definition data file. The format component also includes source code for formatting the flight software variable values as telemetry stream parameters according to the master telemetry definition data file. The blocks component includes source code for placing telemetry parameters into a data stream according to the master telemetry definition data file.

In a still further aspect of the present invention, a computer readable media includes a source code capable of being interpreted for execution by a computer processor. The source code provides information sufficient for production of an operational flight program implementing steps of: accessing actual values of flight software variables when in a live mode; accessing canned values of flight software variables when in a canned mode; scaling the flight software variable values producing scaled values; formatting the scaled values as telemetry parameters; and placing the telemetry parameters into a telemetry data stream.

In a yet further aspect of the present invention, an aircraft has a computer, and the computer executes an operational flight program produced by auto-generation from a master telemetry definition data file. The operational flight program implements steps of: accessing actual values of flight software variables when in a live mode; accessing canned values of flight software variables when in a canned mode; scaling the flight software variable values producing scaled values; formatting the scaled values as telemetry parameters; and placing the telemetry parameters into a telemetry data stream.

In another aspect of the present invention, a method of testing and verifying telemetry flight software includes steps of: compiling an auto-generated telemetry flight software into an operational flight program for testing; running the operational flight program in a canned mode; writing a simulated telemetry data stream from the operational flight program to a data file; and decoding the data file into a tabular format showing a value of each telemetry parameter in the simulated telemetry data stream data file.

In another aspect of the present invention, a method for verifying correct operation of telemetry flight software includes steps of: reading a set of canned values; and comparing a value actually written by an operational flight program to a simulated data stream with a value from the set of canned values expected to be written.

In another aspect of the present invention, a telemetry flight software generation system includes at least one computer; and a set of computer processable instructions, which when processed by computer create: (1) a set of documentation files that define a telemetry stream; (2) a set of source code files that make up a flight software that when executed generates the telemetry stream; (3) a set of telemetry stream tabular definition files for ground-based computers running decoding software that decodes the telemetry stream according to a defined format of the telemetry stream provided by the telemetry stream tabular definition files; (4) canned data test values that are embedded within the flight software and used for test and verification; and (5) documentation files including a parameter definitions file, a parameter range definitions file, and a canned values report.

In another aspect of the present invention, a method of allocating data to a telemetry stream includes steps of: matching a data frequency at which a new data is desired to be telemetered to bytes in the telemetry stream with a lowest remaining availability frequency that is at least as great as the data frequency of the new data; and allocating the new data to the bytes having the required availability frequency.

These and other features, aspects and advantages of the present invention will become better understood with reference to the following drawings, description and claims.

There is a need for providing telemetry flight software that is automatically generated along with reliable matching specifications for defining the format of the telemetry stream so that the software is verifiable. There is also a need for providing automatically generated definition files for decoding software.

BRIEF DESCRIPTION OF THE DRAWINGS

FIGS. 2A and 2B are an illustration of a master telemetry definition data file in accordance with one embodiment of the present invention;

FIG. 6A is an illustration of an enumerated types definition file in accordance with one embodiment of the present invention;

FIG. 6B is an illustration of a parameter definitions file in accordance with one embodiment of the present invention;

FIG. 6C is an illustration of a parameter range definitions file in accordance with one embodiment of the present invention;

FIG. 6D is an illustration of a canned values report file in accordance with one embodiment of the present invention;

FIG. 6E is an illustration of a telemetry frames definitions summary file in accordance with one embodiment of the present invention;

FIG. 6F is an illustration of a spare parameters report file in accordance with one embodiment of the present invention;

DETAILED DESCRIPTION OF THE INVENTION

Figure 1:
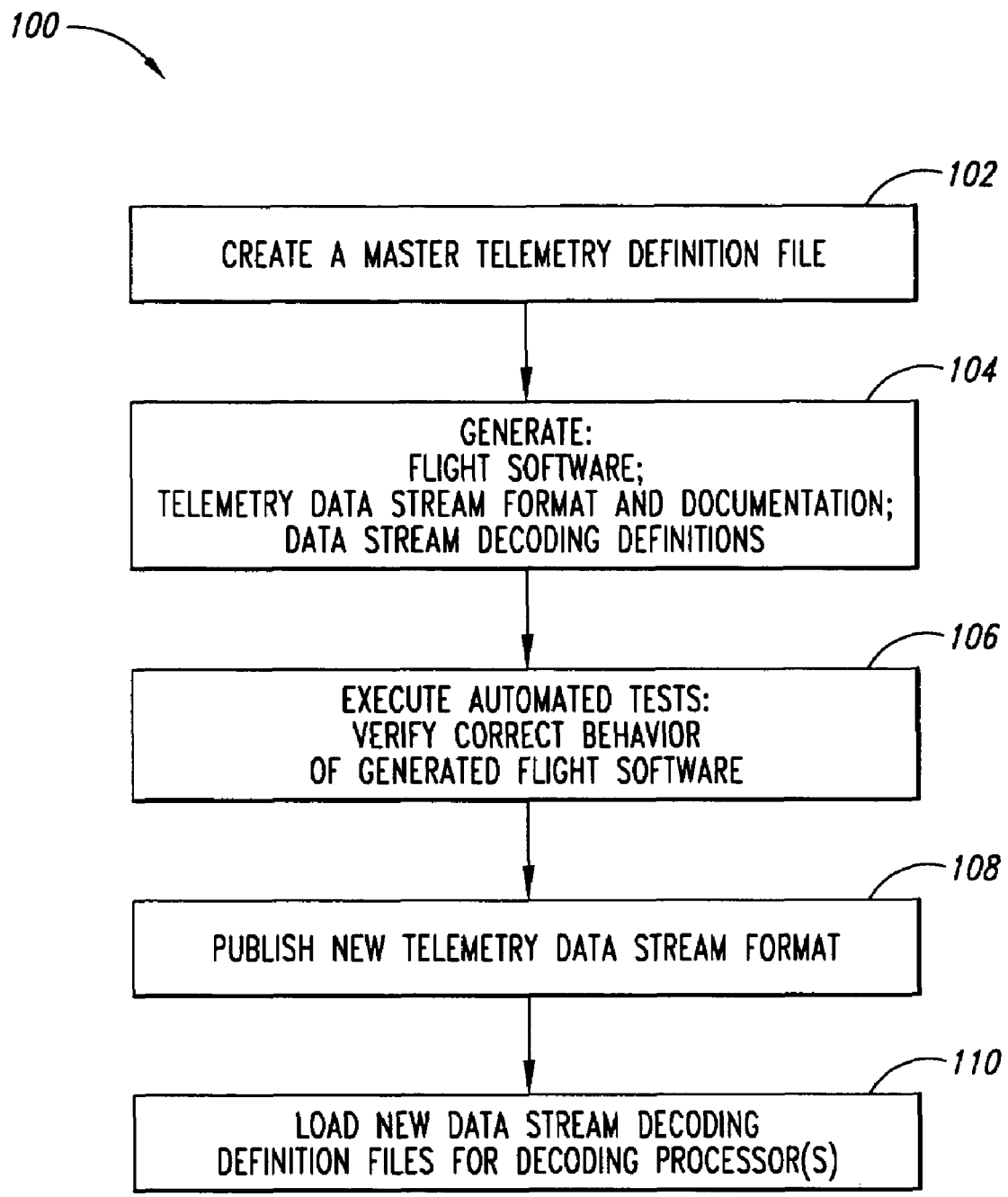
FIG. 1 is a flowchart of a method in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides automatic generation of telemetry flight software source code, telemetry data stream format definitions, and decoding definitions. Embodiments of the present invention may be useful, for example, for commercial as well as military aircraft and spacecraft missions. Embodiments may be useful for monitoring vehicles in flight and may also be useful for controlling vehicles in flight, whether manned or unmanned. Applications may include such diverse examples as launching communications satellites into orbit to monitoring and guiding missiles. Other embodiments may be useful for providing telemetry monitoring and control data for any remotely monitored vehicle including land vehicles and marine vessels.

A telemetry flight software generation system, according to one embodiment, may automatically create: (1) a complete set of documentation that defines the telemetry stream, (2) a complete set of necessary source code files that make up the flight software and generate the telemetry stream, (3) a complete set of necessary telemetry stream "tabular definition" files for ground-based computers running decoding software that will decode the telemetry stream according to the defined format of the telemetry stream, (4) "canned data" test values that are embedded within the flight software and used for test and verification, (5) accompanying documentation that can be used to help engineers who might be trying to judge the reasonableness of the specified and generated telemetry stream. It is usually difficult to verify the correctness of the ground-based decoding software because it is usually not independently known what values the flight software is telemetering to the ground-based decoding software. In regard to the canned test data described in item (4) above, the flight software can be commanded to telemeter the test values instead of "live" actual values. Using the known test values, crosschecks can be performed that the ground-based telemetry-decoding computers are correctly displaying expected values. The canned data may also be used to automatically verify the correctness of the flight software that the telemetry flight software generation system generates.

Until the present invention, automatic source code generation that specifically addresses the problems outlined above for creating telemetry flight software has not been seen in the prior art. Neither has a comprehensive method for generating corresponding data definitions to go along with the source code for operation flight software been seen until the present invention. Nor has a comprehensive method of including the data definitions in a human readable or user friendly format to go along with the data definitions used by the flight software been seen until the present invention. Furthermore, a method also has not been seen until the present invention that integrates generation of flight software code with a means either to test and verify correctness of the telemetry flight software or to test and verify correctness of decoding software (or both).

Referring now to FIG. 1, flow chart of method 100 provides an overview of telemetry flight software generation, telemetry data stream format and documentation generation, test facilitation, and decoding facilitation in accordance with an exemplary embodiment of the present invention. At step 102 of method 100, a master telemetry definition data file may be created. The master telemetry definition data file may be created "from scratch" or may be created by modifying an already existing master telemetry definition data file. An example of the contents of such a data file is illustrated in FIGS. 2A and 2B by master telemetry definition data file 200, and is further described below. A master telemetry definition data file—such as data file 200, further described below—may provide for human input, for example, by an engineer involved in the project, of telemetry data stream information so that human error is minimized—for example, by minimizing or eliminating entry of redundant information and providing a "human-understandable" format for the information in the file—yet may be a complete specification for all telemetry parameters so as to serve as an input file for a computer program for telemetry flight software generation and telemetry data stream format and documentation generation. Step 102 may include review for accuracy, for example, by a fellow engineer of the engineer referred to above, of the human input, which may include creation of the data file 200 or changes to it.

Figure 3:
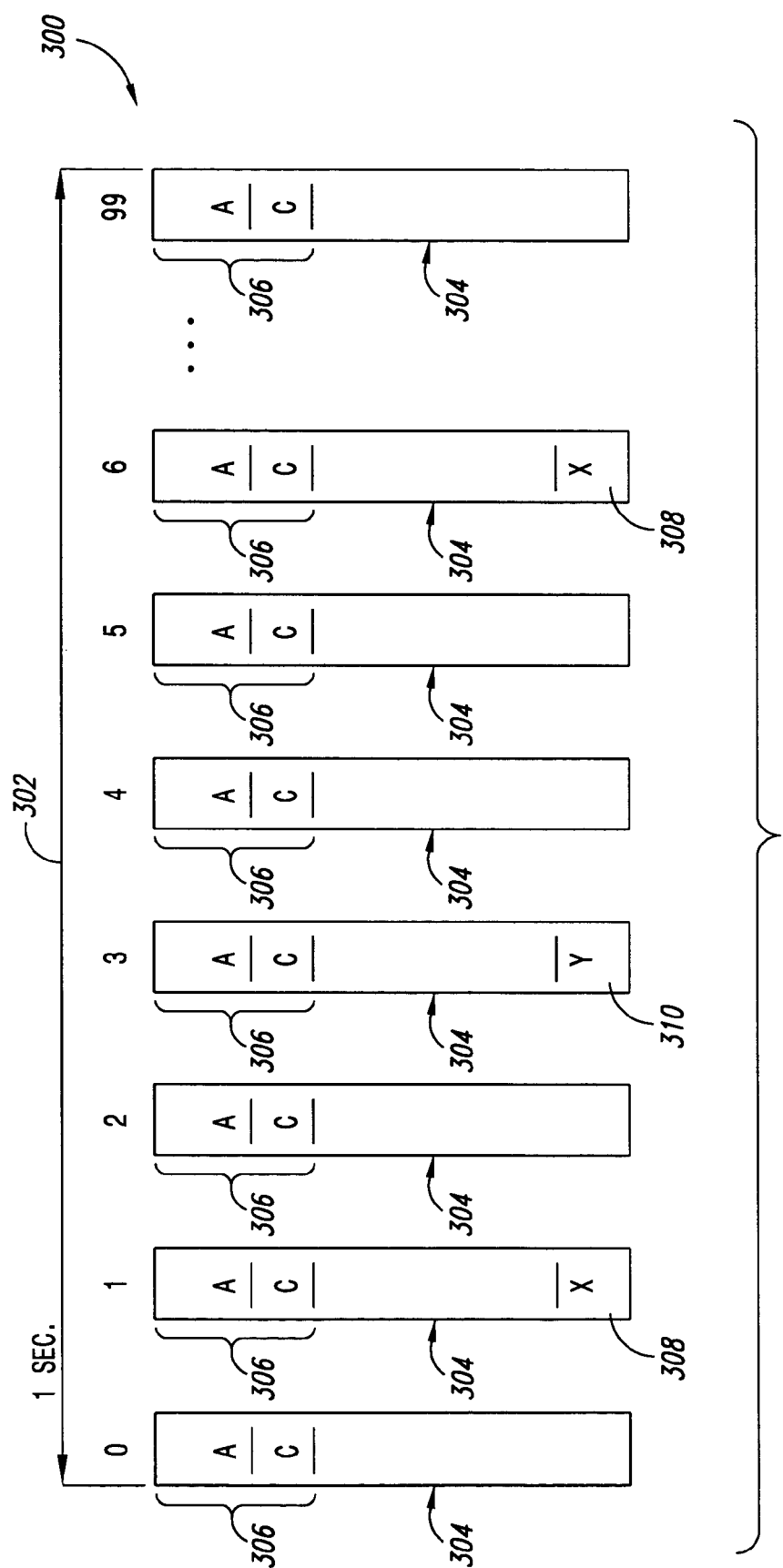
FIG. 3 is a schematic diagram of a telemetry data stream in accordance with one embodiment of the present invention.
Figure 4:
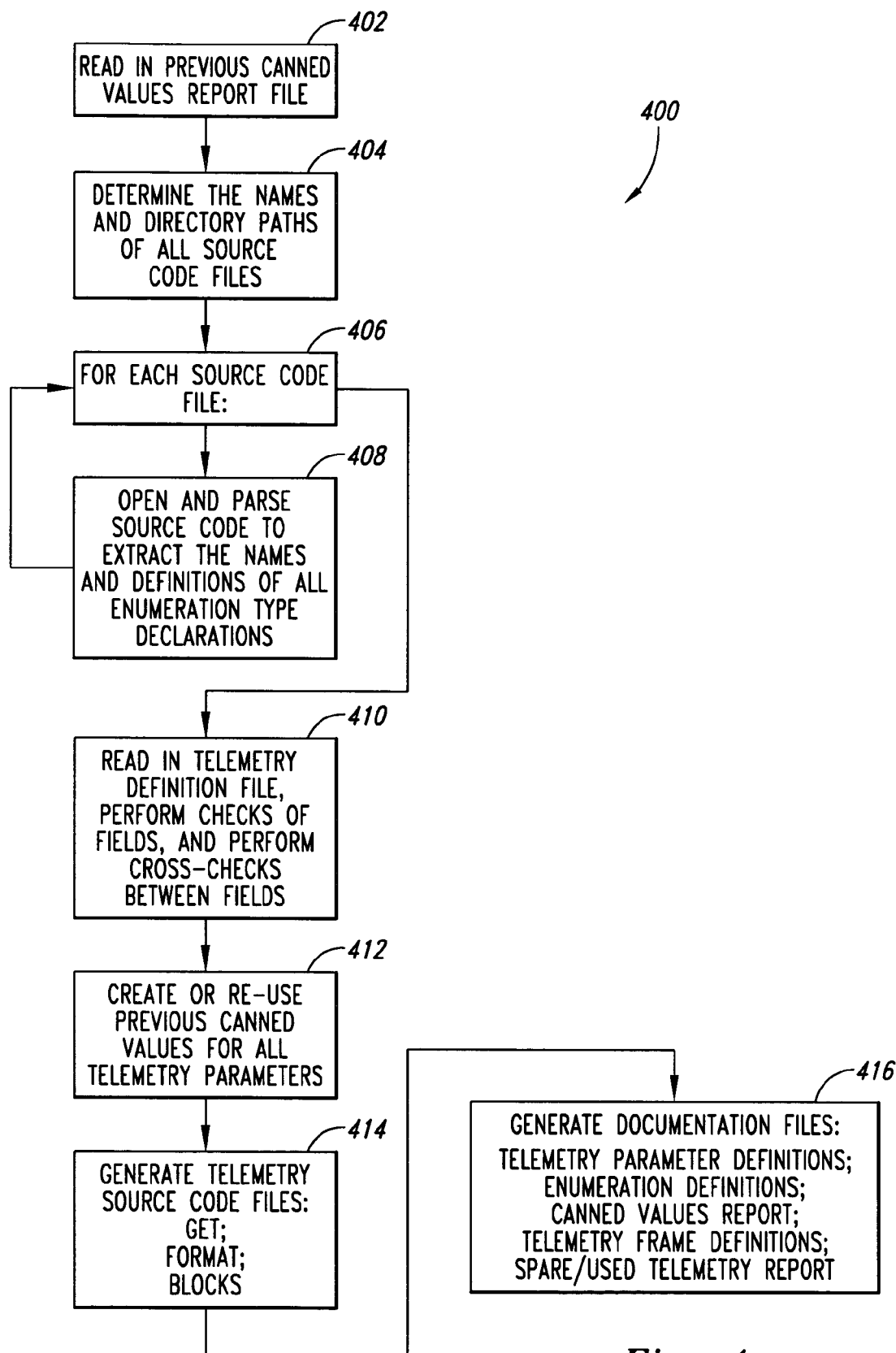
FIG. 4 is a flowchart of a method for auto-generation of telemetry flight software, documentation, and decoding according to one embodiment of the present invention.

At step 104 of method 100, a method for telemetry flight software generation, telemetry data stream format generation, and documentation generation—such as method 400 illustrated in FIG. 4, referred to as "auto-generation"—may be used to generate telemetry flight software including, for example, source code for a programmable computer; telemetry data stream format including, for example, data allocation to the telemetry stream as illustrated in FIG. 3; other forms of documentation, including, for example, documentation described below; and definitions for decoding the telemetry data stream including, for example, decoding definitions described below. The telemetry flight software generated may include "canned" data values for use in testing and verification, as further described below. Step 104 may be performed, for example, by a computer executing software in accordance with a method such as method 400.

Method 100 may include a step 106 for executing automated tests to verify correctness of the operation of the flight software. For example, automated tests may be used to verify that pre-specified ("canned") data values appear in the telemetry stream output by the automatically generated telemetry flight software produced at step 104 according to the definitions specified, for example, by master telemetry definition data file 200. If, for example, verification is not achieved, steps may be taken to correct the software or the data definitions, or both, until verification is achieved. Step 106 may also include tests for verification of decoding definitions and decoding software.

After satisfactory completion of step 106, new telemetry data stream format may be published at step 108. Such publication may include, for example, identification of the most recent version with a unique version number or identifier and distribution of the most recent version of master telemetry definition data file 200 to various engineers and engineering groups concerned with the particular project for which telemetry flight software is being created. Publication at step 108 may also include, for example, such identification and distribution of the documentation and decoding definitions produced at step 104 as well as the telemetry flight software itself. The unique version identifier may be included as data within the telemetry data stream to provide, for example, an assurance of correctness and compatibility of all documentation and definitions with the data stream actually being telemetered. At step 110, data stream decoding definition files, which may contain the data stream decoding definitions produced at step 104 in a suitable format for use by ground based telemetry decoding computers may be loaded into those computers. Automated tests similar to those performed at step 106 may also be performed at step 110 to verify correctness of the decoding process, and indeed of the entire encoding, transmission/reception, and decoding of the telemetry data stream. Automated tests performed at step 110, like those performed at step 106, may, for example, make use of the canned values provided at step 104.

Referring now to FIGS. 2A and 2B, an example of the contents of a master telemetry definition data file is illustrated in FIGS. 2A and 2B by master telemetry definition data file 200. Master telemetry definition data file 200 may be generated manually with the aid of standard computer tools such as a text editor for input of data items or may be generated more automatically, for example, via the use of a database program and may include a unique version identifier as described above, which may also appear in all documentation files, and which may be transmitted in the actual telemetry data stream. Data file 200 may be stored as a computer readable file in any computer readable medium such as memory, magnetic disk, or optical disk such as DVD or CD-ROM.

Master telemetry definition data file 200 may list all flight software variables that are to be telemetered, for example, variables A001 through A006 shown in parameter name column 202a and variables C001 through C005 shown in parameter name column 202b. Data file 200 may list alongside each variable its relevant attributes as shown, for example, in columns 204, 206, 208, 210, 212, 214, 216, and 218. For example, column 204—labeled "Field In Record"—may provide information as to the variable location in the flight software for use by a GET function to retrieve the value of each of variables A001 through A006 shown in the same row of column 202a. For example, column 206 (Classification) may contain a classification for each variable represented by a letter of the alphabet such as "U" as shown. For example, column 208 (# Bits) may contain the number of bits needed by each variable in the telemetry data stream. For example, column 210 ("Source Type") may provide the data type of the variable in the flight software, e.g. "R" for a real variable, "I" for an integer variable as shown.

In addition, for example, column 212 ("TM Type") may provide the data type of the variable in the telemetry (TM) data stream, e.g., "E" for an enumeration type, "U" for unsigned decimal, "S" for signed decimal, "C" for composite field (e.g. contains boolean/bit fields). Enumeration types may be corresponded to a list of values, and additional processing and features may be provided for these types, as further described below. Decimal types may require a scaling factor as provided, for example, at column 214 ("LSB (2\*\*y)"). In the example shown to illustrate one embodiment, telemetry parameter A002, shown at column 202a, has telemetry stream data type of unsigned decimal ("U" shown at column 212) accompanied by scaling factor −14 shown at column 214. Thus, in this particular example, the scaling factor may indicate that the least significant bit of parameter A002 may have a value of $2^{-14}$. The scaling factor may provide, for example, for efficient encoding of numerical data in the telemetry data stream despite the fact that different parameters may have widely varying different ranges of possible values.

Also, for example, column 216 ("TM Units") may provide the (measurement) units for each telemetry flight parameter—such as parameters A001 through A006. For example, "Secs" for seconds of time, "Degrees" for degrees of a circle, and so on, as illustrated in FIGS. 2A and 2B. An enumeration type may have units specific to that type, for example, the units "AP.AP_Mode_Type" of enumerated parameter A001 may specify the enumerated values for Autopilot. AP_Mode_Type which, for example, may be "Low_Gain", "Mid_Gain", and "High_Gain". Enumerated values for all enumerated types may be documented in an enumerated types data file such as the enumerated types data file 217 (named "TM_Enums") shown in FIG. 6A. Documentation data files such as data file 217 may be generated, for example, at step 104 of method 100. At column 218, a description for each telemetry parameter may be given. The description may, for example, describe the purpose or function of the parameter, e.g., for engineering use.

In addition to specifying the telemetry stream parameters and their attributes, the master telemetry definition data file 200 may also specify other requisite information. Such information may include, for example, information about how to get telemetry stream data from the flight software and information about where to put the telemetry stream data into the telemetry stream. As an example of where to get telemetry stream data, for example, data file 200 may specify the name 222 of the variable in the flight software that contains the parameters. For example, the variable AP named by name 222 contains the telemetry parameters A001 through A006. Data file 200 may also specify, for example, the frequency 224 (measured in Hertz (Hz)) at which the variable is to be sampled (e.g., accessed with a software get operation), the beginning frame 226 in each cycle of telemetry data stream frames for the data from the variable is to appear, a switch 228 indicating whether or not canned data is to be created for the variable, the name of the function 230 to use to access the variable in software, and the data type 232 returned by the function 230. Of course, any other information that is either desired or needed by the engineering team can be included in data file 200, as can be understood by one of ordinary skill in the art.

As an example of where to put telemetry stream data, for example, data file 200 may specify blocks of data that appear at a certain frequency and may specify the starting point of each block in the telemetry data stream. For example, definition block 234 may specify that telemetry stream data named "100 Hz_Info", including the telemetry parameters A001 through A004, a spare parameter "Spare_B03", and telemetry parameters C001 and C002 is to appear in the telemetry data stream at a frequency of 100 Hz beginning at frame number zero. In other words, the telemetry parameters belonging to the 100 Hz_Info block are periodically repeated in the data stream with updated values one hundred times per second. FIG. 3 provides a diagrammatic representation of a telemetry data stream 300 according to the example used to illustrate one embodiment. FIG. 3 shows a one second long portion 302 of data stream 300, and data stream 300 may repeat cyclically in one second long portions such as portion 302. Each portion 302 may structured as one hundred frames 304, numbered consecutively from 0 to 99 as indicated in FIG. 3, each frame containing telemetry stream data—such as telemetry parameters A001 through A006. For example, the "100 Hz_Info" just described may be placed in data blocks 306. Because the 100 Hz_Info data is to be refreshed 100 times per second, a data block 306 containing 100 Hz_Info data occurs in each of frames 304, beginning at the first frame 304 identified as frame number 0. The data 100 Hz_Info may be positioned within each frame 304 to begin at byte number one of the frame 304, illustrated in FIG. 3 by data blocks 306 being positioned at the top of each frame 304, the letter A denoting the location of parameters A001 through A004 and spare parameter Spare_B03, and the letter C denoting the location of parameters C001 and C002, for example.

Similarly, definition block 236 may specify that telemetry stream data named "20 Hz_Info", including the telemetry parameters A005, a spare parameter "Spare_B02", and telemetry parameters C003 and C004 is to appear in the telemetry data stream 300 at a frequency of 20 Hz beginning at frame number one and positioned within each frame in which the data occurs to end at byte number 180 of the frame. In other words, the telemetry parameters belonging to the 20 Hz_Info block are periodically repeated in the data stream 300 with updated values twenty times per second. Thus, the "20 Hz_Info" just described may be placed in data blocks 308. Because the 20 Hz_Info data is to be refreshed 20 times per second, a data block 308 containing 20 Hz_Info data occurs in each fifth frame 304, beginning at the second frame 304 identified as frame number 1 and continuing with frame number 6, frame number 11 (not shown) and so on through frame number 96 (not shown). The data 20 Hz_Info may be positioned within each frame 304 in which it occurs to end at byte number 180 of the frame 304, illustrated in FIG. 3 by data blocks 308 being positioned at the bottom of each frame 304 in which they occur, the letter X denoting the location of parameters A005, spare parameter Spare_B02, and parameters C003 and C004, for example.

Likewise, definition block 238 may specify that telemetry stream data named "1 Hz_Fin_Info", including the telemetry parameters C005 and A006 is to appear in the telemetry data stream at a frequency of 1.0 Hz beginning at frame number three and positioned within each frame in which the data occurs to end at byte number 180 of the frame. Thus, the "1 Hz_Fin_Info" just described may be placed in data block 310. Because the 1 Hz_Fin_Info data is to be refreshed only one time per second, the data block 310 containing 1 Hz_Fin_Info data occurs only in the fourth frame 304, identified as frame number 3. The data 1 Hz_Fin_Info may be positioned within each frame 304 in which it occurs to end at byte number 180 of the frame 304, illustrated in FIG. 3 by data block 310 being positioned at the bottom of the frame 304 in which it occurs, the letter Y denoting the location of parameters C005 and A006, for example. Another example of data that may be very effectively and efficiently placed in a 1.0 Hz frequency data block—such as data block 310—is the unique version identifier disclosed above in connection with step 108 of method 100. A unique version number of the flight software and all documentation, data files, and definitions may be included as data—such as in data block 310—within the telemetry data stream 300, for example, to provide an assurance of correctness and compatibility of all documentation and definitions with the telemetry data stream 300 as it is actually being telemetered. Such a unique version identifier may also be used to increase the efficiency and effectiveness of verification and testing.

Master telemetry definition data file 200 may be configured, as shown in FIGS. 2A and 2B, so as to be easily human readable and understandable (e.g. user-friendly), yet contain all necessary information needed to be parsed by a telemetry flight software generation program—such as a program that embodies method 400 described below. The file 200 may be organized to be very maintainable so that each flight software engineer (e.g., guidance, flight controls, navigation engineers) involved in the project can review his or her area of concern easily and accurately. For example, ease and accuracy of review may be increased on account of redundant information in the file 200 being minimal.

The configuration of master telemetry definition data file 200 and its use—such as by auto-generation method 400—to automatically create telemetry flight software and documentation may provide a number of benefits and advantages over the prior art. For example, production of telemetry flight software using data file 200 and software and documentation method 400 may entail reduced labor requirements, shortened project schedules, much quicker project-wide turnaround of telemetry stream changes, and significantly fewer errors in the telemetry stream. Reduced labor requirements, reduced schedule, and quicker turn-arounds of telemetry stream changes can be achieved because it may take only an hour or two to: modify the "telemetry definition" data file and have a fellow engineer review the change for accuracy, as at step 102 of method 100 illustrated in FIG. 1; run auto-generation program for telemetry flight software, telemetry data stream format, and documentation (e.g., perform method 400) to generate flight software, documentation, and tabular telemetry decoding definitions of the telemetry stream for ground computers, as at step 104; run the automated tests to verify correct behavior of the auto-generated flight software, as at step 106; publish the new telemetry stream format, as at step 108; and load new definition files into ground telemetry-decoding computers, as at step 110. Previous to the present invention, each step—such as modifying flight software, generating new telemetry stream definitions, and modifying telemetry stream decoding software—was done sequentially, and each step might take days to accomplish. Errors in and reiterations of the process of steps 102 through 110 may be reduced compared to the prior art methods of producing telemetry flight software and documentation because: (1) the information that engineers enter and maintain is in a format that is more engineer-friendly, (2) the information can be better reviewed by fellow engineers, (3) the auto-generation software can check for many errors that an engineer could make in the data file—such as data file 200—providing more error checking than was previously afforded by flight software compilers against "hand-written" telemetry flight software, (4) there is virtually no redundant information in the data file, and although there must of necessity still be redundant information in the flight software, the auto-generation software can enter it consistently, (5) the auto-generation software can generate a consistent set of outputs that includes flight software, telemetry stream documentation, and tabular definition of the telemetry stream for telemetry decoding, and (6) the automatically generated canned data inside the flight software may be telemetered on command as a way of positively verifying the correctness of ground-based telemetry-decoding processing, for example, by computers on the ground.

Referring now to FIG. 4, a method 400 for auto-generation of, for example, flight software, documentation, and tabular telemetry decoding definitions is illustrated. Steps 402 through 408 may be performed upon a reiteration of the process of method 400 after an original iteration, and thus steps 402 through 408 are described below. Method 400 may be initiated, for example, upon a first performance or original iteration, at step 410. Method 400 may be implemented by a computer running a software program. For example, an embodiment of method 400 can be implemented using a software program written in the "freeware" PERL (Practical Extraction and Report Language) programming language and can be executed by a suitable computer, such as a personal computer.

At step 410, a computer or other processor executing method 400 (in brief, method 400) may begin by reading, for example, reading into a computer memory, a master telemetry definition data file such as file 200 described above. Method 400 may then use the information contained in the master telemetry definition file 200 to ascertain, for example, all the flight software variables that must be gathered and where they are to be gathered from; the attributes—such as specified representation (e.g. columns 210, 212), sizing (e.g. column 208), and scaling (e.g. column 214)—of each software variable and telemetry parameter; and where all these variables and telemetry parameters are to be placed in the telemetry stream. At this point, it may check for many possible errors that could be present in the master telemetry definition file 200.

If no errors are found, method 400 may continue at step 412 by creating new canned values or re-using previous canned values of telemetry parameters, which may be used, for example, for verification and testing. If method 400 has been initiated at step 410, method 400 may create new canned values for a given telemetry parameter, for example, in accord with whether the switch 228 in data file 200 is set to "Yes" for that parameter. The canned value may be created, for example, using a random number generator to create a raw value and then performing various operations— such as arithmetical operations—on the raw value to conform it to the attributes—such as representation (e.g. column 212), sizing (e.g. column 208), and scaling (e.g. column 214)—needed for the given parameter, as can be understood by one of ordinary skill in the art. If method 400 has been initiated at step 402, then step 402 may be performed to simply read in, for example, read into computer memory, canned values for all parameters for which canned values have previously been created (as provided by a canned values report to be described below). Thus, step 412 may save resources by not re-creating previously created canned values and only creating canned values for parameters for which canned values have not yet been created.

Figure 5:
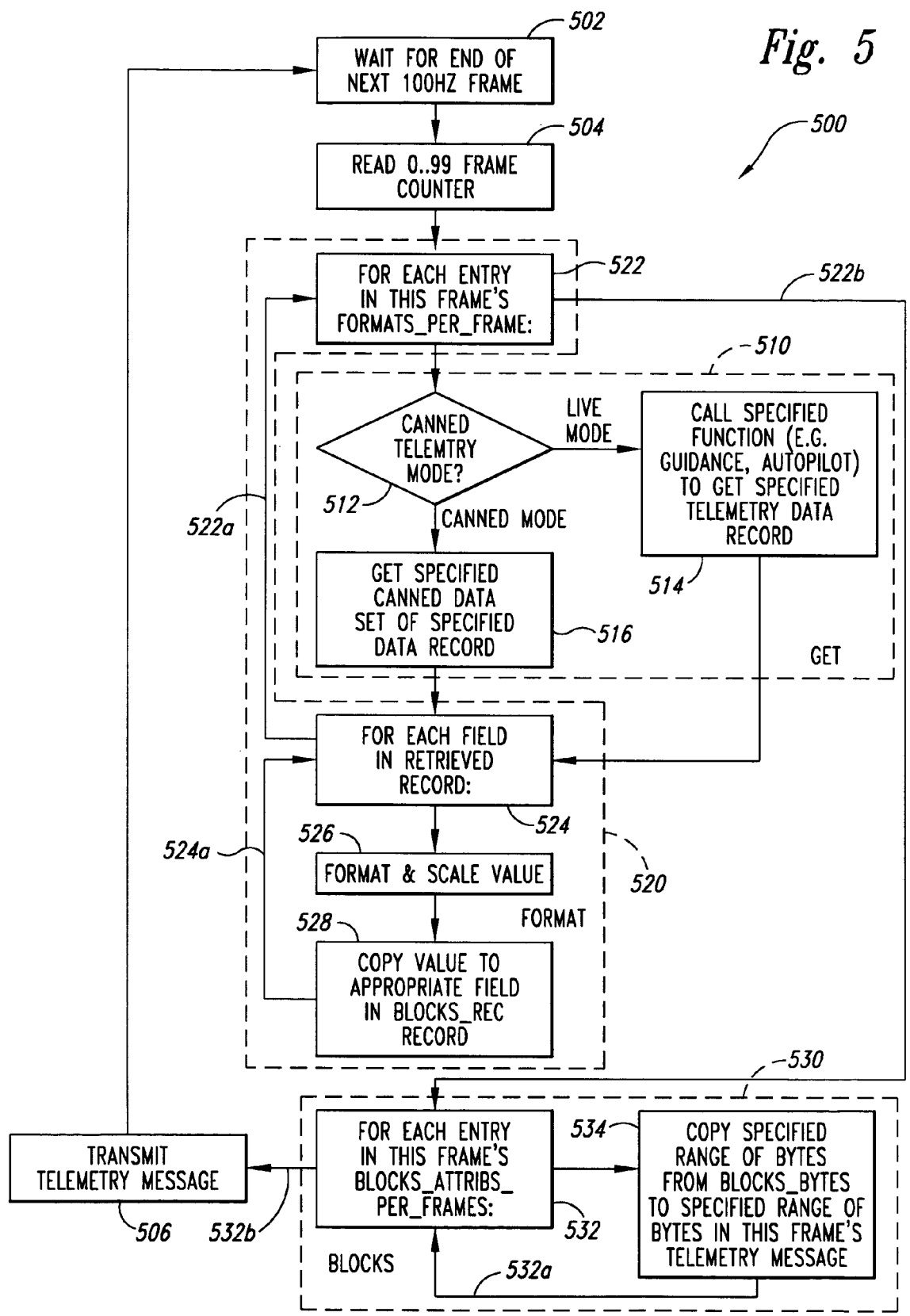
FIG. 5 is a flowchart of an operational flight program method in accordance with one embodiment that may be implemented by a telemetry flight software produced according to one embodiment of the present invention.

At step 414, method 400 may generate telemetry flight software source code files, which may be stored on a computer readable medium, and which may be used, for example, to implement operational telemetry flight software—or operational flight program—for data stream telemetry method 500 illustrated in FIG. 5. If method 400 has been initiated at step 402, e.g., if a previous iteration of method 400 has been performed, steps 404, 406, and 408 may be performed before step 414 to extract names of all enumeration date types for telemetry parameters from previously generated source code. For example, the name and definition of data type "Autopilot.AP_Mode_Type" illustrated in data file 217 shown in FIG. 6A may be extracted from previously generated source code by performing steps 404, 406, and 408. Alternatively, enough information may be included in master telemetry definition data file 200 to provide the name and definition of each enumerated data type that appears in master telemetry definition data file 200, e.g., data type AP.AP_Mode_Type of parameter A001 appearing at column 216 of master telemetry definition data file 200, shown in FIG. 2A. At step 414, generation of flight software telemetry source code may be composed of three components, referred to as "Get", "Format", and "Blocks", as shown in FIG. 4 comprising, respectively: (1) getting the flight software variables from the appropriate location and at the appropriate times; (2) formatting each variable into a telemetry parameter having, for example, the proper type, size, and scaling; and (3) generating a telemetry stream that contains the "right" parameters located at the "right" locations, and at the "right" times—such as data blocks 306, 308, and 310 of data stream 300 described above. The master telemetry definition data file 200 may contain enough information for each of these parts (1) through (3) to be carried out successfully, and to produce, for example, a source code, which may be stored in a computer readable medium and whose execution may comprise the method 500 of FIG. 5 for telemetering a telemetry data stream such as telemetry data stream 300. For example, the source code may be generated in the "Ada" programming language, the "C" programming language or any other language considered appropriate for a desired application, as apparent to one of ordinary skill in the art.

Referring now to FIG. 5, data stream telemetry method 500 is illustrated. Method 500 may be implemented, for example, by first generating source code—also referred to as autocoded source code—then compiling the source code into operational telemetry flight software and executing the operational telemetry flight software of method 500 on a processor, which may be on board a vehicle such as an aircraft or spacecraft in flight, for example. As referred to above, software source code generation for method 500 may be generated as a get component 510, a format component 520, and a blocks component 530. In addition, source code may be generated for other steps of method 500 that may be standard or relatively non-varying from project to project, such as source code for step 502, which may coordinate execution of method 500 with a real-time environment in which it operates; source code for step 504, which may set up a loop structure for operation of method 500 to fill each frame—such as frames 304 of data stream 300; and source code for step 506, which may interface the telemetry software to, for example, communications software or hardware that may implement, for example, radio frequency (RF) communications.

Get component 510 may include source code for performance of steps 512, 514, and 516, for example. Source code for step 512 may include a decision in which performance of method 500 is directed between alternative steps 514 and 516 according as to whether the telemetry flight software is being performed in an operational mode, e.g. telemetering actual flight data, ("Live Mode") or in a test mode, e.g. telemetering the artificial (and known) canned data for test and verification purposes ("Canned Mode"). For example, at step 106 of method 100 (or at any other time), the operational flight software of method 500 may be given an input which causes step 512 to branch to step 516 in which method 500 may get software variable canned values for the telemetry parameters from the canned data set. The canned data values may be generated at step 414 of method 400 during generation of source code for component 510 and may be embedded in the source code for component 510. Alternatively, the operational flight software of method 500 may be placed in an operational mode ("Live Mode") that would be used, for example, during actual operation of the operational flight software of method 500 in a vehicle in flight. For example, the operational flight software of method 500 may be given an input which causes step 512 to branch to step 514, or may simply default to step 514, in which method 500 may get software variable values for the telemetry parameters from the flight software of the vehicle which may be interfaced, for example, to vehicle hardware such as sensors, controllers, resolvers and servo-mechanisms.

Source code generation at step 414 of method 400 for get component 510 of method 500 may use information from master telemetry definition data file 200 to generate appropriate function calls to get the flight software variables (step 514) and to generate canned values for those variables. For example, variable name 222, name of the get function 230, and data type 232 returned by function 230 provide enough information to generate source code for get component 510 to access, in the example used to illustrate one embodiment, an autopilot software variable, which may be a record, for example, whose fields (see column 204 of data file 200) contain the data needed for telemetry parameters A001 through A006. Also, for example, frequency 224 can be used to generate source code for get component 510 that accesses the variable at the proper frequency for that variable—such as 100 Hz for the autopilot variable, as shown in FIG. 2A—and beginning frame 226 can be used to generate source code for get component 510 that coordinates the timing of access of flight software variables at the proper frequency with timing of the output of telemetry parameters that contain information from the variable—such as beginning autopilot access at frame number 0 (the first frame) because autopilot data occurs (in the example used to illustrate one embodiment, as shown in FIG. 3) in every frame 304 of data stream 300.

Also, for example, switch 228 may be used for source code generation at step 414 of method 400 to decide whether or not to include canned test value data for a given variable in the source code for get component 510. In the example used to illustrate one embodiment, switch 228 indicates that the generated source code should include canned data for the autopilot variable, as shown in FIG. 2A. The same information used for access source code generation (e.g. variable name 222, data type 232) may also be used for generation of source code for get component 510 to make canned values, for example, by using a random number generator to generate a value of the appropriate data type—such as data type 232 for variable name 222. The canned data values can then be embedded in the source code for get component 510. Canned data values can be made not only to fit the data type, but also depending on information given in data file 200, for example, at column 210 (source type, e.g., integer or real number) and at columns 216 and 218 (units of measurement and description) extreme values for canned data values can also be provided. For example, for an integer or real type a greatest possible positive value (most positive) and least possible negative value (most negative) can be made, and for a real type a smallest possible fractional part (e.g. a "tiniest" or smallest magnitude possible) also can be made.

Software source code generation for method 500 may continue with format component 520. Format component 520 may include source code for performance of steps 522, 524, 526, and 528, for example. Source code for step 522 may include a loop structure, for example, oriented toward frame-by-frame processing of telemetry data stream 300 and that is coordinated with the frame-by-frame loop structure provided by steps 502 and 504. Thus, step 522 may include a loop control that is dependent on the types of data to be packed into each frame 304 of data stream 300. For example, at frame number 0 of FIG. 3, operations of get component 510 and format component 520 would be repeated for the "A" type data and the "C" type data of block 306, according to the example being used to illustrate one embodiment, while at frame number 1 of FIG. 3, operations of get component 510 and format component 520 would be repeated for the "A" type data and the "C" type data of block 306 and the "X" type data of block 308. The loop control of step 522 may cause get component 510 and format component 520 operations to be repeated for each data type in a frame as indicated by flow of control arrow 522a. Once processing is completed for all data types in the frame 304 at hand, control may be passed to blocks component 530, as indicated by flow of control arrow 522b, so that blocks component 530 operations may be performed once for the frame at hand (according to the frame-by-frame loop structure provided by steps 502 and 504).

Source code generation at step 414 of method 400 for format component 520 of method 500 may use information from master telemetry definition data file 200 to generate appropriate formatting and scaling (step 526) to produce a telemetry stream parameter value. For example, information at columns 208, 210, 212, 214, and 216 may be used to convert a value of a software variable—such as Autopilot-_Time shown in column 202—from a real value—shown in column 210—to a 32-bit value (columns 208, 212) with an appropriate scaling of $2^{-14}$ at the least significant bit (column 214) to produce telemetry stream parameter A002 (column 202a). At step 528, source code generation at step 414 of method 400 for format component 520 of method 500 may generate source code for storing each telemetry stream parameter value in a memory location specific to that parameter (for example, indicated as "Blocks_Rec" in FIG. 5) where the parameter value will be accessible during operations performed by blocks component 530. Step 524 may provide a loop structure—indicated along with flow of control arrow 524a—so that each software variable of a retrieved record may be processed. For example, each of the fields shown in column 204 of FIG. 2A may be processed so that each of telemetry parameters A001 through A006 shown in column 202a of FIG. 2A is scaled, formatted, and stored.

Software source code generation for method 500 may continue with blocks component 530. Blocks component 530 may include source code for performance of steps 532, and 534, for example. Source code for step 532 may include a loop structure, for example, oriented toward frame-by-frame processing of telemetry data stream 300 and that is coordinated with the frame-by-frame loop structure provided by steps 502 and 504. Thus, step 532 may include a loop control that is dependent on the blocks of data to be packed into each frame 304 of data stream 300.

For example, at frame number 0 of FIG. 3, operations of blocks component 530 would be performed for telemetry data of block 306, according to the example being used to illustrate one embodiment, while at frame number 1 of FIG. 3, operations of blocks component 530 would be performed for telemetry data of block 306 and block 308. Moreover, at frame number 2 of FIG. 3, operations of blocks component 530 would be performed for telemetry data of block 306, and at frame number 3 of FIG. 3, operations of blocks component 530 would be performed for telemetry data of block 306 and block 310, and so on for each of the one hundred telemetry frames 304 indicated in FIG. 3. It should be noted that the invention is not limited to one hundred telemetry data frames nor to any particular time interval, but that 100 telemetry frames repeated each time interval of 1.0 seconds have been chosen as specific values in the example used to illustrate one embodiment.

The loop control of step 532 may cause blocks component 530 operations to be repeated for each data block in a frame 304 as indicated by flow of control arrow 532a. Once processing is completed for all data blocks in the frame 304 at hand, control may be passed to step 506, as indicated by flow of control arrow 532b, so that blocks component 530 operations may be performed once for the frame at hand and then the telemetry information in the frame at hand may be transmitted.

Source code generation at step 414 of method 400 for blocks component 530 of method 500 may use information from master telemetry definition data file 200 to generate appropriate instructions (step 534) for placing data blocks of telemetry stream parameters—such as data blocks 306, 308, and 310—into a frame 304 of telemetry stream 300. For example, information at definition block 234 may be used for generating source code to copy each telemetry stream parameter value of A001 through A004, C001 and C002 from the memory location specific to that parameter—for example, indicated as "Blocks_Rec" in FIG. 5 where the parameter value has been stored by source code generated by format component 520 as described above—to the data block 306 of the frame at hand, i.e., of the frame 304 being processed. Similarly, information at definition block 236 may be used for generating source code to copy each telemetry stream parameter value of A005, C003 and C004 to data blocks 308 when appropriate, for example, when frames number 1, 6, and each fifth frame thereafter of frames 304 are being processed. Likewise, information at definition block 238 may be used for generating source code to copy each telemetry stream parameter value of C005 and A006 to data block 310 when appropriate, for example, when frame number 3 of frames 304 is being processed.

Continuing with FIG. 4, at step 416 method 400 may generate a number of computer readable files and documents, where "document" may be used to mean a computer readable file that may be printed out on hardcopy or viewed on a display and may present information in a human readable or user-friendly format. Information from master telemetry definition data file 200 may be used to generate, for example: (1) documents that engineers may use when manually programming a telemetry-decoding computer; (2) files that can be automatically imported into a telemetry-decoding computer such as a Veridian OMEGA™ telemetry-decoding computer; (3) a file that can be automatically imported into a tool that decodes telemetry data for display via a viewing tool; (4) a file that describes the flight software variables and telemetry parameters that have enumerated data types as described above; (5) a document that contains the canned data values; (6) a number of documents and files that are useful to engineers for helping verify the correctness and reasonableness of the specified and generated telemetry stream (e.g. characterization of spare telemetry stream bytes); and (7) files that may be used when the auto-generated flight software is "unit tested", for example, to automatically verify that the auto-generated flight software is correct before it is incorporated into an operational flight program.

In particular, FIGS. 6A through 6E illustrate some examples of documentation files which may generated in accordance with the example used to illustrate one embodiment.

FIG. 6A illustrates enumeration definitions file 217 that may describe the flight software variables and telemetry parameters that have enumerated data types. File 217 has been described above in connection with FIGS. 2A and 2B, FIG. 4, and steps 404, 406, and 408. File 217 may capture, for example, that the "autopilot mode type" data type for flight software variables and telemetry parameters has the following value-to-description mapping: "0=Low Gain", "1=Mid Gain", 2=High Gain". An enumerated types data file—such as file 217—may be generated at step 416, for example, by reading in all the flight software source code—generated at step 414, for example—to identify where the value-to-description definitions are created in the flight software, and then extracting these definitions into the file.)

FIG. 6B illustrates parameter definitions file 610. Parameter definitions file 610 may be generated at step 416 of method 400 in the form of a spreadsheet as shown by FIG. 6B and may be generated, for example, as an Excel® spreadsheet file. File 610 may contain definition information pertinent to each telemetry parameter, and listed by telemetry parameter as shown, so that no redundant or conflicting information occurs. Thus, file 610 may be used, for example, for telemetry decoding definitions, or for maintaining telemetry parameter definitions including updating the master telemetry definition data file 200.

FIG. 6C illustrates parameter range definitions file 620. Parameter range definitions file 620 may be generated at step 416 of method 400 in the form of a spreadsheet as shown by FIG. 6C and may be generated, for example, as an Excel® spreadsheet file. File 620 may contain definition range information pertinent to each telemetry parameter listed by telemetry parameter, as shown, so that no redundant or conflicting information occurs. For example, for each parameter a greatest possible positive value (most positive) and least possible negative value (most negative) may be listed, and for real type parameters a smallest possible fractional part (e.g. a "tiniest" or smallest magnitude possible) also can be listed. In the case of an integer type parameter such as A005, the "tiniest" value may be a step size—such as 1 unit as shown in FIG. 6C. In the case of an enumerated type parameter such as A001, the most positive, most negative, and tiniest values may be the values specific to the enumerated type—such as Low_Gain, Mid_Gain, and High_Gain for Autopilot_Mode_Type of A001 as shown in FIG. 6C. File 620 may be used, for example, for telemetry decoding definitions, or for maintaining telemetry parameter definitions including updating the master telemetry definition data file 200.

FIG. 6D illustrates canned values report file 630. Canned values report file 630 may be generated at step 416 of method 400 in the form of a spreadsheet as shown by FIG. 6D and may be generated, for example, as an Excel® spreadsheet file. File 630 may contain canned values which may have been generated at step 412 of method 400, for example, as described above. The canned values for each telemetry parameter may be listed by telemetry parameter, as shown, so that no redundant or conflicting information occurs. For example, for each parameter a most positive, a most negative, and a tiniest value (as described above) may be listed, and in addition a number of random test values may also be provided. As shown in FIG. 6D, for example, a set of four random values may be provided in addition to most positive, most negative, and tiniest for each parameter for which canned values have been provided. File 630 may be used during software generation, for example, at step 412 of method 400 where flight software source may be generated for step 516 of method 500; and for example, for testing as described above and further described below.

FIG. 6E illustrates telemetry frames definitions summary file 640. Telemetry frames definitions summary file 640 may be generated at step 416 of method 400 in the form of a spreadsheet as shown by FIG. 6E and may be generated, for example, as an Excel® spreadsheet file. File 640 may provide a "picture" of telemetry data stream 300 similar to the illustration given by FIG. 3. Thus, each column of FIG. 6E may represent one of the 100 frames 304 in the example used to illustrate one embodiment, and each row may represent one byte of each frame 304. As in the example used to illustrate one embodiment, there may be 180 bytes in each frame 304, for example, shown numbered from 0 to 179 in FIG. 6E. File 640 may contain a frequency legend 642 that may provide a key to the availability of each byte of data stream 300 for transmitting telemetry data at a given frequency (referred to as the availability frequency of the byte). For example, cells representing bytes that already are allocated to data, and are therefore unavailable, may contain the name of the telemetry parameter allocated to that byte of telemetry stream 300—such as byte 644 at byte 0 of frame 0 containing "A001"—along with a code from legend 642 indicating the data rate of the parameter—such as byte 644 at byte 0 of frame 0 containing the code "6". Bytes not already containing data and which are available for data at 100 Hz, for example, may be marked with the code "6"—such as byte 646 at byte 9 of frame 0. Bytes not already containing data but which are unavailable for data at 100 Hz, for example, because of the presence of lower frequency data at that byte location in other frames—such as 20 Hz data for parameter A005 at byte 648 (byte 164 of frame 1)—may be marked with a code for the highest frequency data which may be allocated to that byte. For example, byte 650 (byte 164 of frame 0) may be marked with the code "4" to indicate that 20 Hz data is the highest frequency data that may be allocated to byte 650 due to the presence (e.g. prior allocation) of 20 Hz data at byte 648. Thus, file 640 may facilitate a method of efficiently allocating new data to telemetry stream 300 by matching the frequency at which the data is desired to be telemetered (referred to as the data frequency) to bytes with the lowest remaining availability frequency that is at least as great as the data frequency of the new data and allocating the new data to bytes having that availability frequency.

FIG. 6F illustrates spare parameters report file 650. Spare parameters report file 650 may be generated at step 416 of method 400 in the form of a spreadsheet as shown by FIG. 6F and may be generated, for example, as an Excel® spreadsheet file. File 650 may contain information in a human readable text format that, for example, summarizes information given by telemetry frames definitions summary file 640 and other information about data stream 300. For example, file 650 may provide a compact source of information about the availability of unallocated bytes in data stream 300, the location and frequency availability of such unallocated bytes and percentage usage (e.g. allocation or non-allocation of telemetry data to bytes) of data stream 300. For example, as seen in FIG. 6F, spare parameters report file 650 may show that more than 90% of data stream 300 is available for allocation ("total number of spare bytes") due to the example used to illustrate one embodiment being a simplified example with a small number of telemetry parameters for brevity and clarity. File 650 may be used, for example, for maintaining telemetry parameter definitions and allocations including updating the master telemetry definition data file 200.

Figure 7A:
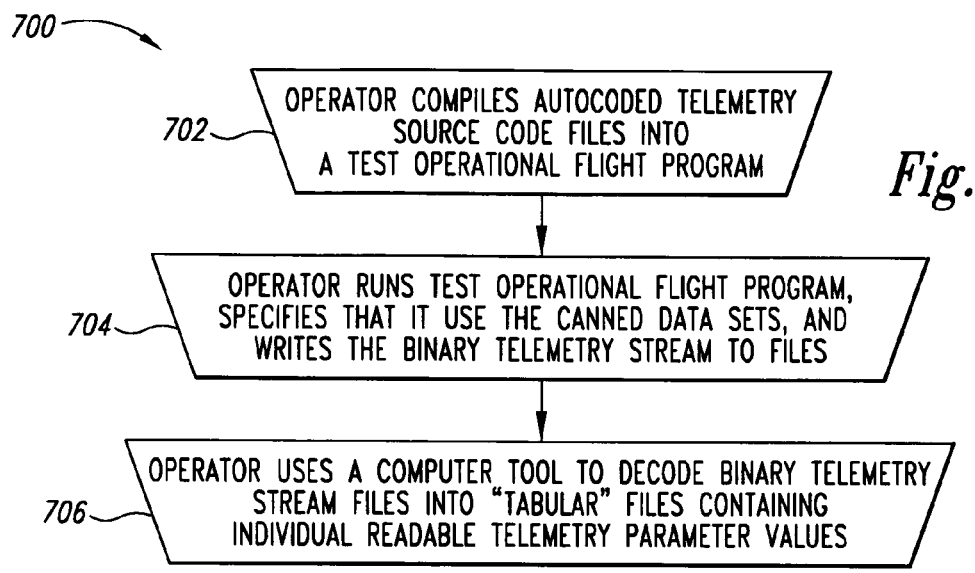
FIG. 7A is a flowchart of a method of testing telemetry software in accordance with an embodiment of the present invention.

Referring now to FIG. 7A, a method 700 of verifying telemetry software in accordance with an embodiment of the present invention is illustrated. At step 702, an operator—such as a flight telemetry engineer—may compile auto-generated telemetry flight software, e.g. autocoded source code for implementing data stream telemetry method 500—such as may produced at step 414 of method 400, into an operational flight program for testing. Such an operational flight program may provide an implementation, when executed, of method 500. At step 704, an operator may run the operational flight program, for example, by executing it on a computer and providing input, as described above, for causing the operational flight program to use canned data values for the telemetry data stream—such as telemetry data stream 300. For testing purposes, the telemetry data stream need not actually be telemetered but, rather, may be written to a binary computer data file, for example, to simulate telemetry and reception of a telemetry data stream—such as telemetry data stream 300.

At step 706, the operator may use a computer tool, e.g., a software program executed on a computer, to read and decode the binary computer data file containing the telemetry data stream information, or simulated telemetry data stream, which was created at step 704. Such a computer tool may be created especially for the purpose or, alternatively, a pre-existing computer tool may be used. For example, the computer tool may use information from master telemetry definition data file 200, or documentation files such as parameter definitions file 610, parameter range definitions file 620, canned values report file 630, and definitions summary file 640 to decode the data stream information of the binary computer data file and produce, for example, text files or other human-readable display in a tabular format showing, for example, the name of each telemetry parameter and its corresponding value in the simulated telemetry data stream of the binary computer file. The computer tool may also be used to check the values in the simulated telemetry data stream against the pre-determined canned values expected to be written into the simulated telemetry data stream by the operational flight program at step 704 and produce a report of any errors or discrepancies found, for example, in accordance with method 750 illustrated in FIG. 7B. Similarly, the unique version identifier described above may also be checked and verified.

Figure 7B:
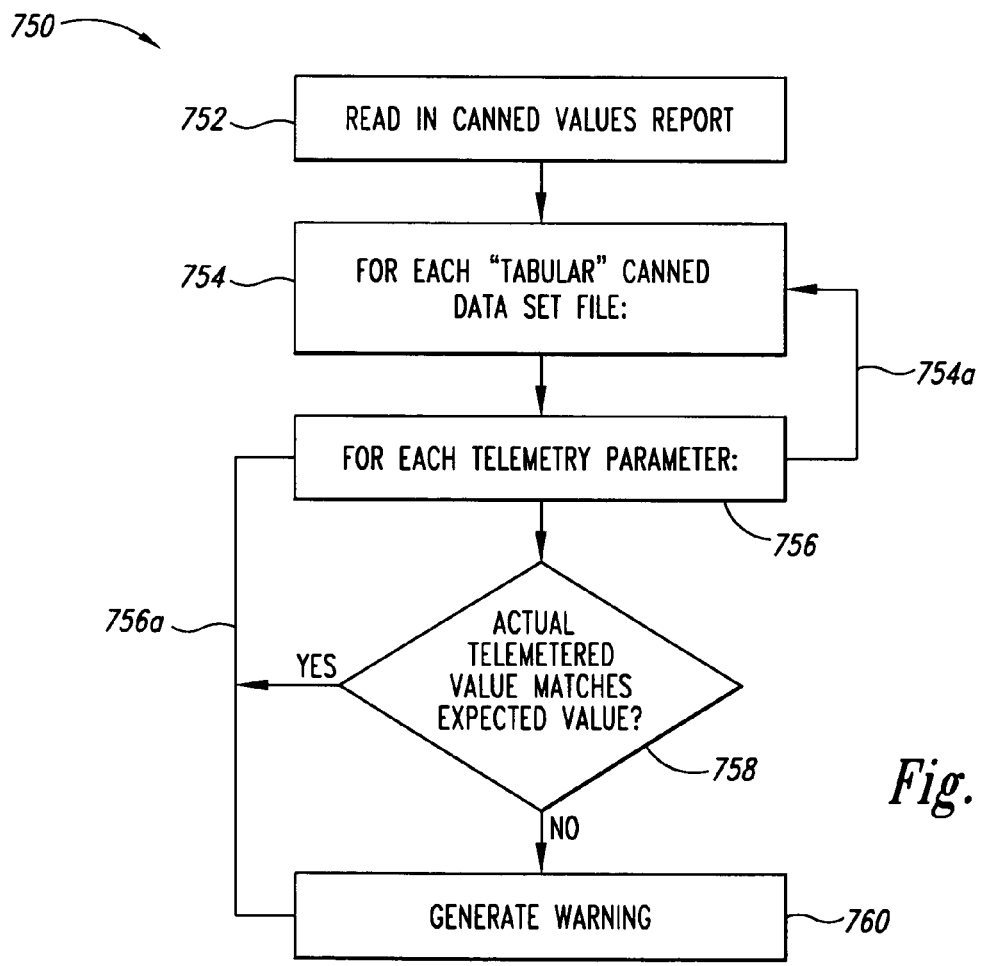
FIG. 7B is a flowchart of a method for verifying telemetry software in accordance with an embodiment of the present invention.

Referring now to FIG. 7B, a method 750 for verifying correct operation of telemetry software is illustrated in accordance with an embodiment of the present invention. At step 752, a set of pre-determined canned values expected to be written into the simulated telemetry data stream by the operational flight program (e.g. of method 500) at step 704 may be read, for example, into a computer memory. Such a set of canned values may be provided from a canned values report file 630 that is generated in coordination along with the operational flight program (e.g. of method 500) being tested. Steps 754 and 756, along with flow of control arrows 754a and 756a may provide a loop structure to ensure that all of the canned data and each of the telemetry parameters processed by the operational flight program (e.g. of method 500) are examined at step 758. At step 758, the telemetry parameter value actually written by the operational flight program (e.g. of method 500) to the simulated data stream (at step 704 of method 700, for example) may be compared to the value (from canned values report file 630, for example) expected to be written. Similarly, the unique version identifier described above may also be checked and verified. If the values match, e.g., the operational flight program (e.g. of method 500) has operated correctly, then method 750 may continue in the loop structure of steps 754 and 756 and flow of control arrows 754a and 756a to examine the next elements of canned data and telemetry parameters. If the values do not match, e.g., the operational flight program (e.g. of method 500) has operated incorrectly, then method 750 may generate a warning at step 760—for example, by writing a message to a file or producing a display which may contain, for example, the parameter and canned data information that may be needed to correct the problem—before continuing in the loop structure of steps 754 and 756 and flow of control arrows 754a and 756a to examine the next elements of canned data and telemetry parameters until all of the canned data and each of the telemetry parameters processed by the operational flight program (e.g. of method 500) are examined.

It should be understood, of course, that the foregoing relates to exemplary embodiments of the invention and that modifications may be made without departing from the spirit and scope of the invention as set forth in the following claims.

I claim:
1. A method comprising the steps of:
   using a master telemetry definition data file to produce an operational flight program for telemetry;
   executing said operational flight program using a set of canned values; and verifying correct operation of said operational flight program using said set of canned values.

2. The method of claim 1, further comprising the step of:
creating said master telemetry definition data file.

3. The method of claim 1, wherein the using step further comprises:
producing a source code for a programmable computer, said source code used to implement a data stream telemetry method.

4. The method of claim 1, wherein the using step further comprises generating at least one documentation file.

5. The method of claim 1, wherein the using step further comprises the step of:
generating telemetry data stream format.

6. The method of claim 1, further comprising the steps of:
testing a telemetry flight software and data definitions wherein said telemetry flight software includes said operational flight program and said master telemetry definition data file includes said data definitions;
correcting said telemetry flight software and data definitions; and
publishing a new telemetry data stream format.

7. The method of claim 1, further comprising the steps of:
loading a data stream decoding definition file into a decoding processor.

8. A method for producing telemetry flight software, comprising steps of:
reading a master telemetry definition data file; and
producing a source code for a programmable computer for implementing a data stream telemetry method according to said master telemetry definition data file, said source code including a format component, wherein:
said format component includes source code for scaling flight software variable values; and
said format component includes source code for formatting said values as telemetry stream parameters.

9. The method of claim 8, wherein said producing step further includes:
producing a source code for a programmable computer, said source code including a get component and a blocks component, wherein:
said get component includes source code for accessing flight software variables; and
said blocks component includes source code for placing telemetry parameters into a data stream.

10. The method of claim 8, wherein said producing step further includes:
producing a source code for a programmable computer, said source code including a set of canned values for telemetry parameters, wherein said set of canned values are created and written into a canned values report.

11. The method of claim 8, wherein said producing step further includes:
producing a source code for a programmable computer, said source code including a set of canned values for telemetry parameters, wherein said set of canned values are read from a canned values report.

12. The method of claim 8, wherein said producing step further includes:
producing a source code for a programmable computer, said source code including a name and definition for an enumerated data type.

13. A method for producing telemetry flight software, comprising steps of:
reading a master telemetry definition data file; and
producing a source code for implementing a data stream telemetry method, said source code including a get component and a blocks component, wherein:
said get component includes source code generated according to said master telemetry definition data file for accessing flight software variables; and
said blocks component includes source code generated according to said master telemetry definition data file for placing telemetry parameters into a telemetry data stream.

14. The method of claim 13, wherein said reading step further includes:
reading a plurality of parameter names from said master telemetry definition data file.

15. The method of claim 13, wherein said reading step further includes:
reading a parameter name from said master telemetry definition data file; and
reading a name of a flight software variable for said parameter from said master telemetry definition data file.

16. The method of claim 13, wherein said reading step further includes:
reading a flight software variable name from said master telemetry definition data file; and
reading a sampling frequency for said flight software variable name from said master telemetry definition data file.

17. The method of claim 13, wherein said reading step further includes:
reading a parameter name from said master telemetry definition data file; and
reading a telemetry frequency for said parameter name from a definition block of said master telemetry definition data file.

18. A method for producing telemetry flight software and documentation files, comprising steps of:
reading a master telemetry definition data file;
producing a source code for implementing a data stream telemetry method according to said master telemetry definition data file; and
generating documentation files for said source code according to said master telemetry definition data file, wherein said generating documentation files includes generating decoding definition files including a parameter definitions file.

19. The method of claim 18, wherein said generating step further includes:
generating a parameter range definitions file.

20. The method of claim 18, wherein said generating step further includes:
generating a canned values report.

21. The method of claim 18, wherein said generating step further includes:
generating an enumerated types data file.

22. The method of claim 18, wherein said generating step further includes:
generating a telemetry frames definitions summary file.

23. The method of claim 18, wherein said generating step further includes:
generating a spare parameters report file.

24. Computer readable media, including instructions capable of being interpreted for execution by a computer processor, said instructions providing information sufficient for:
reading a master telemetry definition data file;

producing a source code for implementing a data stream telemetry method, wherein said source code includes a get component, a format component, and a blocks component, wherein:
- said get component includes source code for accessing flight software variable values according to said master telemetry definition data file;
- said format component includes source code for scaling said flight software variable values according to said master telemetry definition data file;
- said format component includes source code for formatting said values as telemetry stream parameters according to said master telemetry definition data file;
- said blocks component includes source code for placing telemetry parameters into a data stream according to said master telemetry definition data file; and generating documentation files for said source code.

25. The computer readable media of claim 24, wherein said documentation files include a parameter definitions file, a parameter range definitions file, and a canned values report.

26. Computer readable media including a source code capable of being interpreted for execution by a computer processor, said source code providing information sufficient for production of an operational flight program implementing steps of:
- accessing actual values of flight software variables when in a live mode;
- accessing canned values of flight software variables when in a canned mode;
- scaling said flight software variable values producing scaled values;
- formatting said scaled values as telemetry parameters; and
- placing said telemetry parameters into a telemetry data stream.

27. The computer readable media of claim 26, wherein said source code of said computer readable media is automatically generated from a master telemetry definition data file.

28. An aircraft having a computer, said computer executing an operational flight program produced by auto-generation from a master telemetry definition data file, said operational flight program implementing steps of:
- accessing actual values of flight software variables when in a live mode;
- accessing canned values of flight software variables when in a canned mode;
- scaling said flight software variable values producing scaled values;
- formatting said scaled values as telemetry parameters; and
- placing said telemetry parameters into a telemetry data stream.

29. A telemetry flight software generation system, comprising:
- at least one computer; and
- a set of computer processable instructions, which when processed by said at least one computer:
- create a set of documentation files that define a telemetry stream;
- create a set of source code files that make up a flight software that when executed generates said telemetry stream;
- create a set of telemetry stream tabular definition files for ground-based based computers running decoding software that decodes said telemetry stream according to a defined format of said telemetry stream provided by said telemetry stream tabular definition files;
- create canned data test values that are embedded within said flight software and used for test and verification; and
- create documentation files comprising a parameter definitions file, a parameter range definitions file, and a canned values report.

* * * * *